US010921786B2

(12) United States Patent
Kono et al.

(10) Patent No.: US 10,921,786 B2
(45) Date of Patent: Feb. 16, 2021

(54) INFORMATION RELAY DEVICE, REMOTE SERVICE SYSTEM, INFORMATION RELAY METHOD, AND NON-TRANSITORY COMPUTER READABLE MEDIUM

(71) Applicant: MITSUBISHI HEAVY INDUSTRIES, LTD., Tokyo (JP)

(72) Inventors: Takayuki Kono, Tokyo (JP); Kenji Takao, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 27 days.

(21) Appl. No.: 16/433,279

(22) Filed: Jun. 6, 2019

(65) Prior Publication Data
US 2019/0384263 A1   Dec. 19, 2019

(30) Foreign Application Priority Data
Jun. 13, 2018  (JP) .............................. JP2018-112677

(51) Int. Cl.
*G05B 19/4155* (2006.01)
*G06F 16/23* (2019.01)

(52) U.S. Cl.
CPC ..... *G05B 19/4155* (2013.01); *G06F 16/2358* (2019.01); *G05B 2219/32398* (2013.01)

(58) Field of Classification Search
CPC ...... G05B 19/4155; G05B 2219/32398; G05B 2219/31457; G05B 19/4185; G05B 2219/31082; G06F 16/2358; Y02P 90/02
See application file for complete search history.

(56) References Cited

U.S. PATENT DOCUMENTS

| 2010/0148940 | A1* | 6/2010 | Gelvin | H04L 67/12 340/286.02 |
| 2011/0191004 | A1* | 8/2011 | Nomura | F02C 9/22 701/100 |
| 2013/0066475 | A1* | 3/2013 | Yokokawa | C02F 1/441 700/281 |
| 2014/0244358 | A1* | 8/2014 | Saito | G06Q 30/01 705/7.32 |

FOREIGN PATENT DOCUMENTS

| JP | 5118373 | 1/2013 |
| WO | 2019/138668 | 7/2019 |

\* cited by examiner

*Primary Examiner* — Ziaul Karim
(74) *Attorney, Agent, or Firm* — Wenderoth, Lind & Ponack, L.L.P.

(57) ABSTRACT

A plant network entrance device includes a change information reception unit configured to receive change information for changing a control parameter of a plant facility from a change execution device, a change information transmission unit configured to transmit the change information to the plant facility, an operation data acquisition unit configured to acquire pre-change operation data that is operation data before a time at which a change in the control parameter based on the change information is made and post-change operation data that is operation data after the time at which the change is made, an improvement rate calculation unit configured to calculate an improvement rate for operation states before and after the change on the basis of the pre-change operation data and the post-change operation data, and an improvement rate transmission unit configured to transmit the improvement rate to the change execution device.

8 Claims, 9 Drawing Sheets

<CHANGE INFORMATION>

| CHANGE REQUEST ID | CONTROL PARAMETER A | CONTROL PARAMETER B | CONTROL PARAMETER C | ... |
|---|---|---|---|---|
| #S001 | A01 | − | − | ... |
| #S002 | − | B02 | C02 | ... |
| ... | ... | ... | ... | ... |

FIG. 7

<CHANGE COMPLETION INFORMATION>

| CHANGE REQUEST ID | STATUS | CHANGE APPLICATION TIME |
|---|---|---|
| #S001 | CHANGED | XXXX/XX/XX xx:xx:xx |
| #S002 | CHANGED | XXXX/XX/XX xx:xx:xx |
| ... | ... | ... |

<CHARGING INFORMATION>

| CHANGE REQUEST ID | KPI IMPROVEMENT RATE | CHARGE |
|---|---|---|
| #S001 | ○ % | ○○ YEN |
| #S002 | △ % | △△ YEN |
| ... | ... | ... |

INFORMATION RELAY DEVICE, REMOTE SERVICE SYSTEM, INFORMATION RELAY METHOD, AND NON-TRANSITORY COMPUTER READABLE MEDIUM

TECHNICAL FIELD

The present disclosure relates to an information relay device, a remote service system, an information relay method, and a non-transitory computer readable medium.

Priority is claimed on Japanese Patent Application No. 2018-112677, filed Jun. 13, 2018, the content of which is incorporated herein by reference.

BACKGROUND ART

In a plant such as a power generation plant, a control parameter applied to a plant facility (a gas turbine, a power generator, or the like) is changed to change an operation state of the plant facility. In a conventional plant, a service clerk of a service provider dispatched to a site changes the control parameter applied to the plant facility while obtaining confirmation from a plant manager or the like. Thus, the work of changing the operation state of the plant facility is time-consuming and expensive work. Therefore, it is desired to change the operation state of the plant facility, i.e., to change or adjust the control parameter applied to the plant facility, from a remote place using a wide area communication network such as the Internet.

Patent Literature 1 discloses a plant control system capable of reducing the risk of facility investment on a user side with respect to a plant control system in which a plurality of control programs are selectively used.

CITATION LIST

Patent Literature

[Patent Literature 1] Japanese Patent No. 5118373

SUMMARY

A service provider submits a proposal for a change (review) of the control parameter to the plant manager who is a customer after ascertaining an operation state of the plant and requests the plant manager to pay compensation for the proposal (service). However, the plant manager cannot ascertain how much of an improvement effect can be obtained on the basis of the change when merely the proposal of the change for the control parameter is presented to the plant manager. Thus, it may be difficult for the service provider to obtain consent from the plant manager about payment of compensation for the service provided to the customer.

At least one embodiment of the present disclosure has been made in view of the above-described circumstances and an objective of the present disclosure is to provide an information relay device, a remote service system, an information relay method, and a non-transitory computer readable medium capable of easily ascertaining the improvement effect of an operation state of a plant based on a change when a control parameter is changed on the basis of a proposal of a service provider.

According to an aspect of the present disclosure, there is provided an information relay device configured to relay information between a plant facility and an external device, the information relay device including: a change information reception unit configured to receive change information for changing a control parameter of the plant facility from the external device; a change information transmission unit configured to transmit the change information to the plant facility; an operation data acquisition unit configured to acquire pre-change operation data that is operation data before a time at which a change in the control parameter based on the change information is made and post-change operation data that is operation data after the time at which the change is made; an improvement rate calculation unit configured to calculate an improvement rate for operation states before and after the change on the basis of the pre-change operation data and the post-change operation data; and an improvement rate transmission unit configured to transmit the improvement rate to the external device.

According to each aspect of the invention described above, it is possible to easily ascertain the improvement effect of an operation state of a plant based on a change when a control parameter is changed on the basis of a proposal of a service provider.

DESCRIPTION OF EMBODIMENTS

First Embodiment

Hereinafter, a plant network entrance device and a remote service system including the same according to a first embodiment will be described with reference to FIGS. 1 to 9.

(Overall Configuration of Remote Service System)

Figure 1:
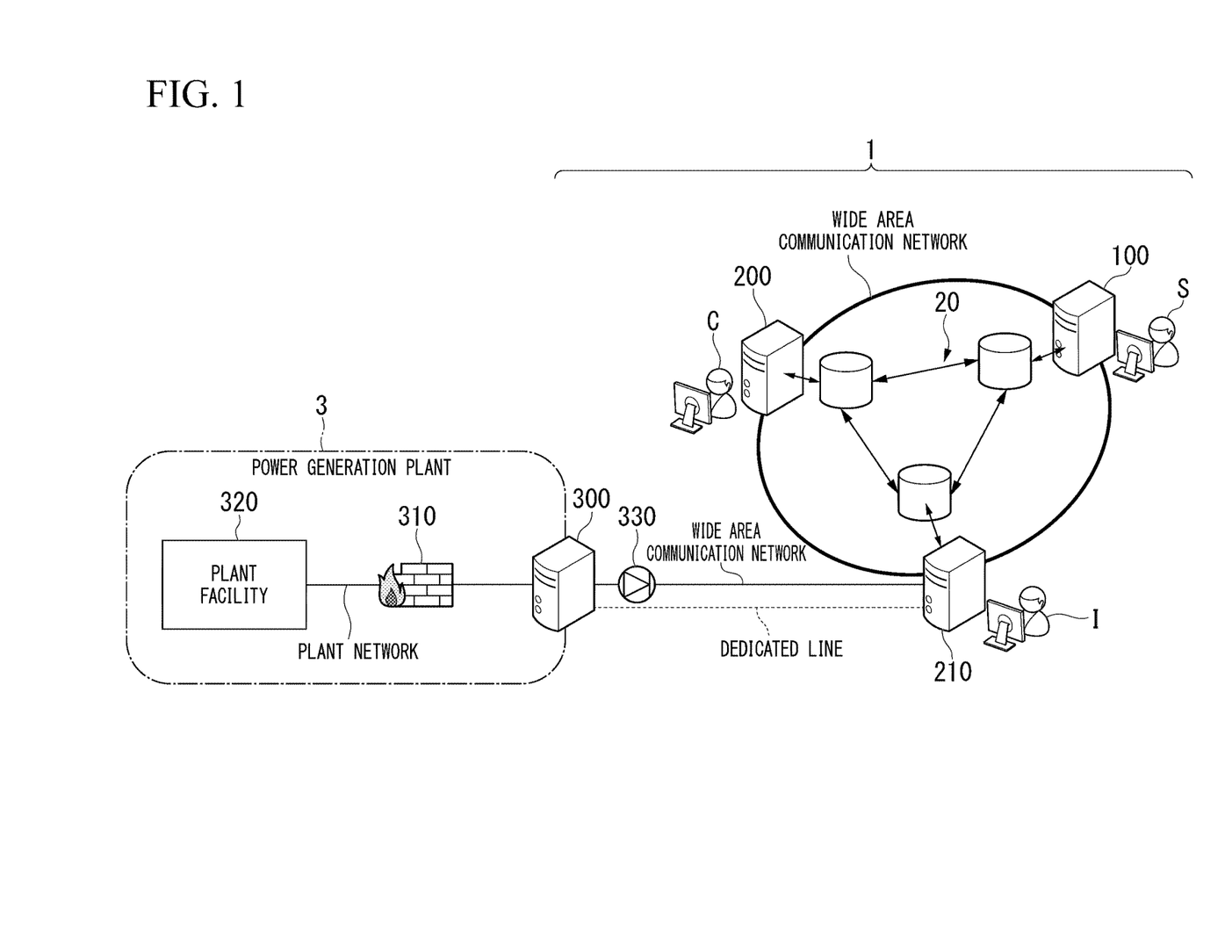
FIG. 1 is a diagram showing an overall configuration of a remote service system according to a first embodiment.

FIG. 1 is a diagram showing an overall configuration of the remote service system according to the first embodiment.

A remote service system 1 shown in FIG. 1 is a system for performing change and adjustment of an operation state of a plant facility 320 disposed within a power generation plant 3 from a remote place.

The remote service system 1 is configured to include a change request device 100, a change confirmation device 200, a change execution device 210, a plant network entrance device 300, and a blockchain 20.

The change request device 100, the change confirmation device 200, the change execution device 210, and the plant network entrance device 300 are connected via a general wide area communication network (for example, an Internet line) such that communication is possible.

Also, as will be described below, the change request device 100, the change confirmation device 200, and the change execution device 210 function as terminal devices for requesting registration of new information (transmitting a transaction) to the blockchain 20 including a plurality of nodes.

The blockchain 20 is an aspect of a distributed ledger system.

The blockchain 20 receives transactions including data to be registered from moment to moment and generates a "block" by integrating the received transactions. The blockchain 20 connects and manages the next generated block using a hash value of the generated block. Blocks newly registered in the blockchain 20 are connected in time series through hash values of previously registered blocks. Thus, all other blocks connected to the block including the data are required to be rewritten to consistently alter the data registered in the blockchain 20. In addition to this, one node registering a certain block immediately transfers the block to each of a plurality of other nodes and shares the block therewith. The respective nodes mutually check the validity of blocks registered therein. This mechanism makes it extremely difficult for a third party to alter data registered in the blockchain 20.

The blockchain 20 according to the first embodiment includes three nodes, and each node is owned and managed by a service provider S, a change detail confirmer C, and a change executant I to be described below.

Also, the present invention is not limited to this aspect and the blockchain 20 may be configured to have more nodes in another embodiment. Also, the nodes of the blockchain 20 may include a data server device incorporated in a cloud computing system.

Also, the blockchain 20 according to another embodiment may be configured such that all of constituent nodes are configured on a cloud and used from each terminal device in a connection method of a client-server scheme.

Also, in the following description, a case in which the entire blockchain 20 functions as one data server device will be described without identifying each node constituting the blockchain 20.

Each of the change request device 100, the change confirmation device 200, and the change execution device 210 is a terminal device that is operated by a user who uses the remote service system 1.

The change request device 100 is a terminal device that is operated by the service provider S. The "service provider S" is, for example, a manufacturer or the like of the plant facility 320 installed in the power generation plant 3. The service provider S not only manufactures and sells the plant facility but also provides the plant manager (the change detail confirmer C to be described below) who actually manages and operates the plant facility with a service of proposing the improvement of the current operation state of the plant facility. For this, the service provider S receives payment of compensation for the service from the plant manager.

The service provider S checks current operation data of the plant facility 320 managed by the plant manager and submits a proposal for improving the operation state of the plant facility 320 to the plant manager. In this case, specifically, the service provider S operates the change request device 100 to input a control parameter to be newly applied to the plant facility 320. The change request device 100 registers information indicating the input control parameter to be newly applied (hereinafter also referred to as "change information") in the blockchain 20.

The change confirmation device 200 is a terminal device configured to be operated by the change detail confirmer C. The "change detail confirmer C" is, for example, a plant manager who manages and operates the plant facility 320 installed within the power generation plant 3. The change detail confirmer C confirms proposal details from the service provider S through the change confirmation device 200. The "proposal details from the service provider S" are the change information registered in the blockchain 20 through the change request device 100. When the change detail confirmer C confirms that the proposal details from the service provider S can be applied to the plant facility 320 without any problem, a procedure of approving the proposal details is performed by operating the change confirmation device 200.

When the change confirmation device 200 receives an operation related to a procedure of approving the proposal details from the change detail confirmer C, approval information indicating that the proposal details from the service provider S are approved is registered in the blockchain 20 in association with the change information indicating the proposal details.

The change execution device 210 is a terminal device configured to be operated by the change executant I. The "change executant I" is, for example, a site worker who actually operates the plant facility 320 installed within the power generation plant 3. The change executant I checks the proposal details proposed by the service provider S through the change execution device 210 and approved by the change detail confirmer C. The "proposal details proposed by the service provider S and approved by the change detail confirmer C" is change information registered in the blockchain 20 through the change request device 100 and associated with the approval information through the change confirmation device 200. Hereinafter, the change information associated with the approval information is also described as "approved change information". Then, the change executant I operates the change execution device 210 to perform a procedure of actually causing the control parameter indicated by the approved change information to be reflected in the plant facility 320.

When an operation related to a procedure of causing a new control parameter to be reflected is accepted from the change executant I, the change execution device 210 transmits change information indicating the new control parameter to the plant network entrance device 300 via a dedicated communication line. The "dedicated communication line" is a communication line installed only between the change execution device 210 and the plant network entrance device 300, particularly, a communication line for transferring information from the change execution device 210 to the plant network entrance device 300. Other terminal devices connected to the wide area communication network cannot access the plant network entrance device 300 through the dedicated communication line.

The plant network entrance device 300 is an information relay device installed at the entrance of a local communication network (hereinafter also referred to as a "plant network") built in the power generation plant 3, and also functions as a secure gateway of the plant network. In other words, the plant network entrance device 300 relays information between an external device (the change execution device 210) and the plant facility 320 to be described below.

When the approved change information has been received from the change execution device 210 through the dedicated communication line, the plant network entrance device 300 transfers the received approved change information to the plant facility 320 connected to the plant network.

A firewall 310 is a network defense function for securing security in a plant network built in a power generation plant as software.

A data diode 330 is a communication network device configured to implement communication in only one direction and physically shut off communication in another direction. As shown in FIG. 1, the data diode 330 is installed on the wide area communication network connecting the plant network entrance device 300 and the change execution device 210 and is configured so that only one-way communication from the plant network entrance device 300 to the change execution device 210 is possible.

(Configuration of Plant Control System)

Figure 2:
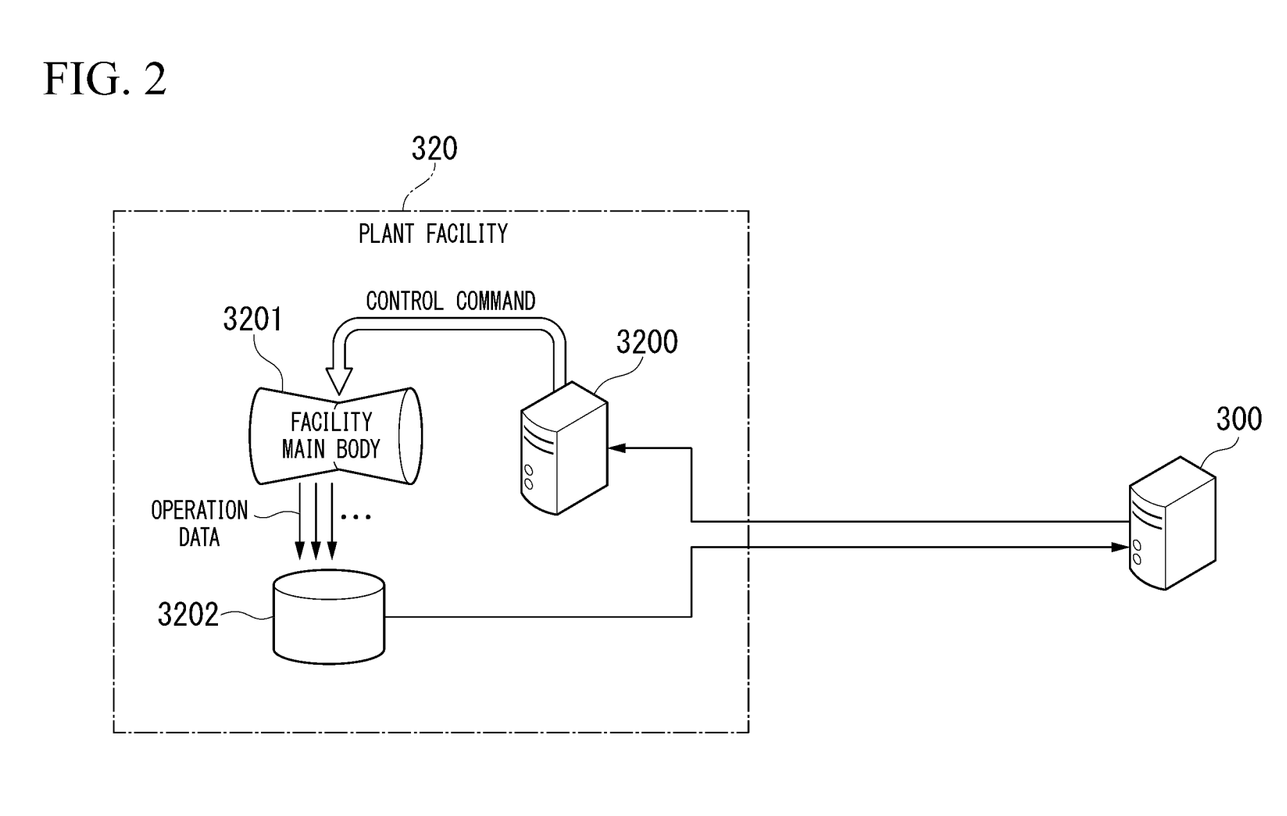
FIG. 2 is a diagram showing a configuration of a plant control system according to the first embodiment.

FIG. 2 is a diagram showing a configuration of a plant control system according to the first embodiment.

Next, a configuration of the plant facility 320 will be described in detail with reference to FIG. 2.

The plant facility 320 shown in FIG. 2 is a facility for power generation installed in the power generation plant 3. As shown in FIG. 2, the plant facility 320 includes a plant control device 3200, a facility main body 3201, and an operation data recording medium 3202.

The plant control device 3200 outputs a control command to the facility main body 3201 to appropriately control the entire facility main body 3201. For example, the plant control device 3200 outputs a control command for appropriately changing an opening degree of a fuel supply valve to keep a rotational speed of a turbine constant. When change information is received from the plant network entrance device 300, the plant control device 3200 performs a process for actually applying a control parameter indicated by change information. Also, when the application of the control parameter indicated by the change information is completed, the plant control device 3200 returns change completion information indicating that a change in the control parameter has been completed to the plant network entrance device 300.

The facility main body 3201 is, for example, a gas turbine, a power generator, or the like. A plurality of various sensors (a temperature sensor, a pressure sensor, a flow sensor, and the like) for detecting the operation state of the facility main body 3201 are attached to various positions on the facility main body 3201.

In the operation data recording medium 3202, time-series operation data of detection results acquired through various sensors is recorded and stored during the operation of the facility main body 3201. The operation data recorded and stored in the operation data recording medium 3202 is referred to by the plant network entrance device 300.

(Hardware Configuration and Functional Configuration of Plant Network Entrance Device)

Figure 3:
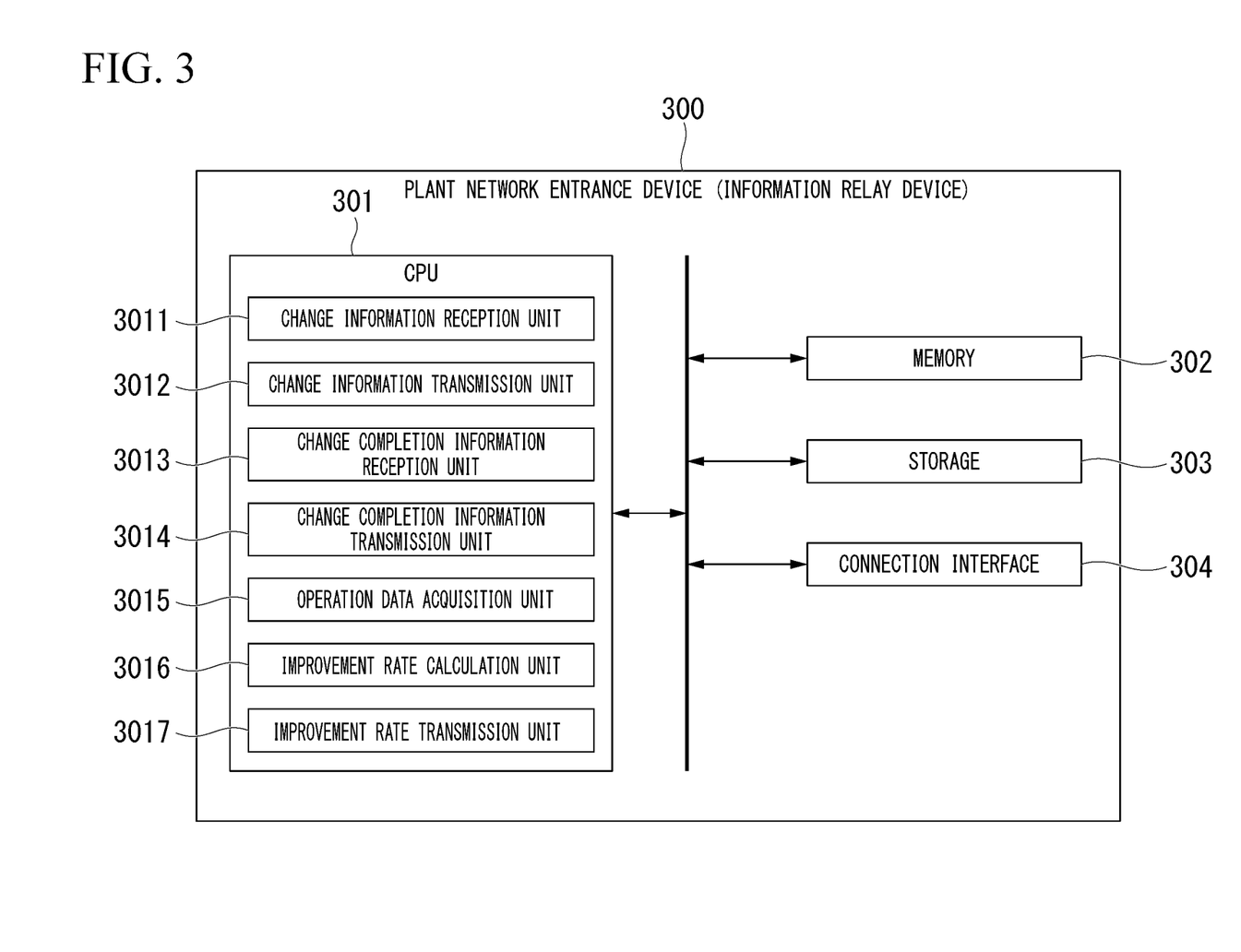
FIG. 3 is a diagram showing a hardware configuration and a functional configuration of a plant network entrance device according to the first embodiment.

FIG. 3 is a diagram showing a hardware configuration and a functional configuration of the plant network entrance device according to the first embodiment.

As shown in FIG. 3, the plant network entrance device 300 includes a CPU 301, a memory 302, a storage 303, and a connection interface 304.

The CPU 301 is a processor for controlling the overall operation of the plant network entrance device 300 to exhibit various functions by operating in accordance with a program prepared in advance.

The memory 302 is a so-called main storage device such as a DRAM and is a storage area necessary for the CPU 301 to operate in accordance with a program.

The storage 303 is a so-called auxiliary storage device such as an HDD or an SSD and information necessary for the plant network entrance device 300 is pre-recorded therein.

The connection interface 304 is a connection interface for connecting to the wide area communication network and the plant network (see FIG. 1).

Next, a function of the CPU 301 will be described in detail.

The CPU 301 operates in accordance with the program prepared in advance to function as a change information reception unit 3011, a change information transmission unit 3012, a change completion information reception unit 3013, a change completion information transmission unit 3014, an operation data acquisition unit 3015, an improvement rate calculation unit 3016, and an improvement rate transmission unit 3017.

The change information reception unit 3011 receives change information for changing the control parameter of the plant facility 320 from the change execution device 210.

The change information transmission unit 3012 transmits the change information received from the change execution device 210 to the plant control device 3200 of the plant facility 320 (FIG. 2).

The change completion information reception unit 3013 receives change completion information indicating that a change in the control parameter according to the change information has been completed from the plant control device 3200 of the plant facility 320.

The change completion information transmission unit 3014 transmits the change completion information received from the plant control device 3200 to the change execution device 210.

The operation data acquisition unit 3015 refers to the operation data recording medium 3202 and acquires operation data before a time at which the change in the control parameter based on the change information is made (hereinafter, also referred to as "pre-change operation data") and operation data after the time at which the change is made (hereinafter also referred to as "post-change operation data").

The improvement rate calculation unit 3016 calculates an improvement rate for key performance indicators (KPIs) before and after the change (hereinafter referred to as "KPI improvement rate") on the basis of the pre-change operation data and the post-change operation data.

The improvement rate transmission unit 3017 transmits the KPI improvement rate calculated by the improvement rate calculation unit 3016 to the change execution device 210.

(Functional Configuration of Change Execution Device and Blockchain)

Figure 4:
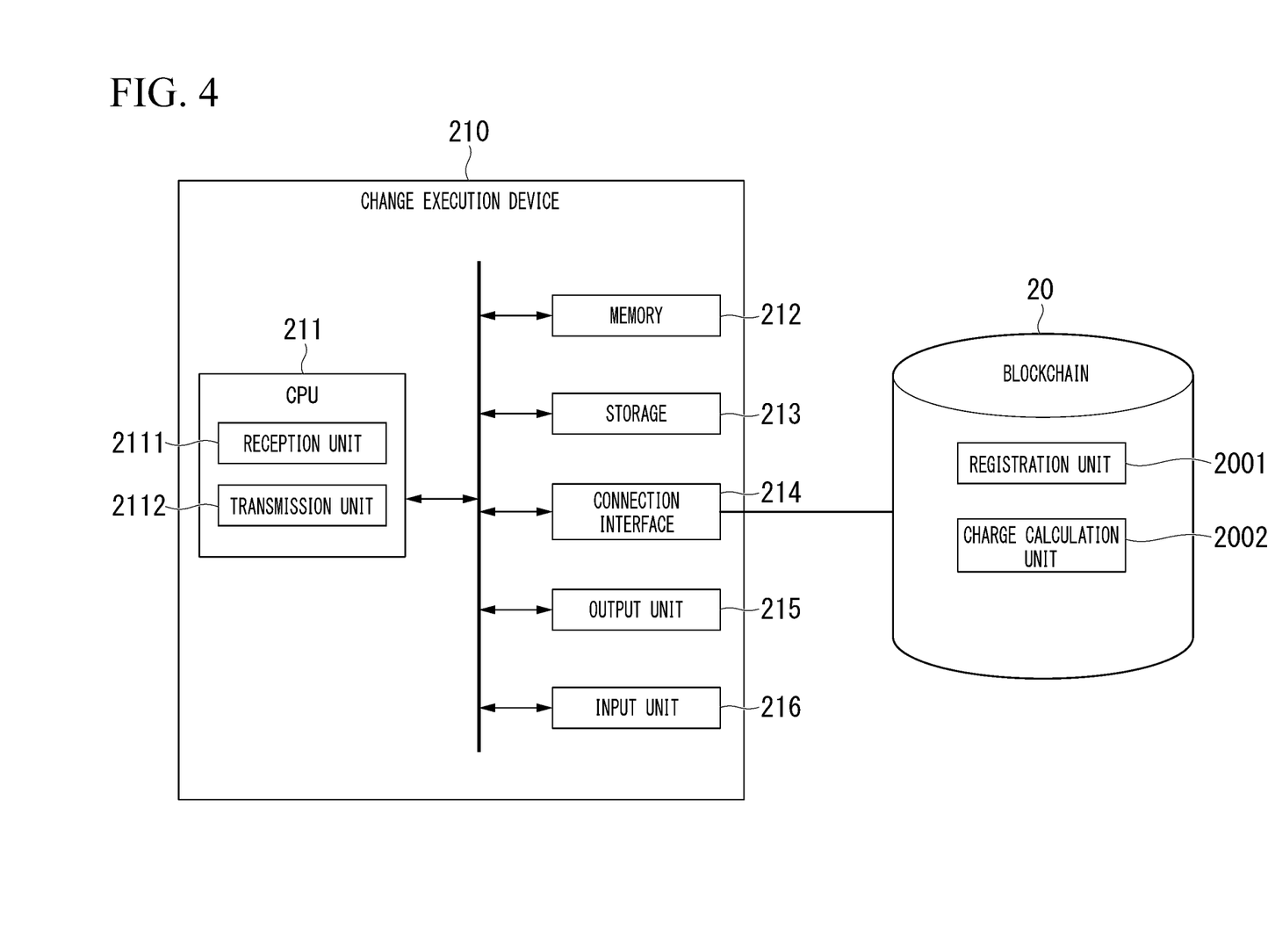
FIG. 4 is a diagram showing a functional configuration of a change execution device and a blockchain according to the first embodiment.

FIG. 4 is a diagram showing a functional configuration of the change execution device and the blockchain according to the first embodiment.

As shown in FIG. 4, the change execution device 210 includes a CPU 211, a memory 212, a storage 213, a connection interface 214, an output unit 215, and an input unit 216.

The CPU 211 is a processor for controlling the overall operation of the change execution device 210 and exhibits various functions by operating in accordance with a program prepared in advance.

The memory 212 is a so-called main storage device such as a DRAM and is a storage area necessary for the CPU 211 to operate in accordance with a program.

The storage 213 is a so-called auxiliary storage device such as an HDD or an SSD and information necessary for the change execution device 210 is pre-recorded therein.

The connection interface 214 is a connection interface for connecting to the wide area communication network or the like.

The output unit 215 is an output device such as a display monitor or a speaker and can visually and audibly present various information to the user (the change executant I).

The input unit 216 is an input device such as a mouse, a keyboard, or a touch panel and accepts an operation of the user.

Also, although the above-described hardware configuration has been described only for the change execution device 210, the change request device 100 and the change confirmation device 200 also have similar hardware configurations. Detailed description of the hardware configurations of the change request device 100 and the change confirmation device 200 will be omitted.

Next, a function of the CPU 211 will be described in detail.

The CPU 211 operates in accordance with the program prepared in advance to function as the reception unit 2111 and the transmission unit 2112.

The reception unit 2111 receives various types of information (change request information to be described below, a KPI improvement rate, and the like) transmitted from the plant network entrance device 300.

The transmission unit 2112 transmits a request (a transaction) for registration of new information to the blockchain 20. Specifically, the transmission unit 2112 includes information (the change request information, the KPI improvement rate, and the like) received by the reception unit 2111 in the transaction, and transmits it toward the blockchain 20.

Next, a function of the blockchain 20 will be described in detail.

The blockchain 20 according to the present embodiment has an automatic execution function (a smart contract) of a program that is difficult to alter and is pre-registered as one of the blocks. The blockchain 20 functions as a registration unit 2001 and a charge calculation unit 2002 by execution of this program.

When a transaction has been received from the change execution device 210, the registration unit 2001 creates a new block into which the transaction is incorporated. The registration unit 2001 combines the created new block with the existing block and registers the new block combined with the existing block.

The charge calculation unit 2002 receives the transaction including the KPI improvement rate transmitted from the plant network entrance device 300 and calculates a charge determined in accordance with the KPI improvement rate when the transaction has been registered as a new block. The calculated charge is further registered by the above-described registration unit 2001.

Also, although the blockchain 20 is schematically described as one data server device in FIG. 2, it is actually a distributed ledger system including a plurality of nodes. The processes of the registration unit 2001 and the charge calculation unit 2002 are actually executed by a plurality of nodes constituting the blockchain 20 in cooperation with each other.

(Processing Sequence of Remote Service System)

Figure 5:
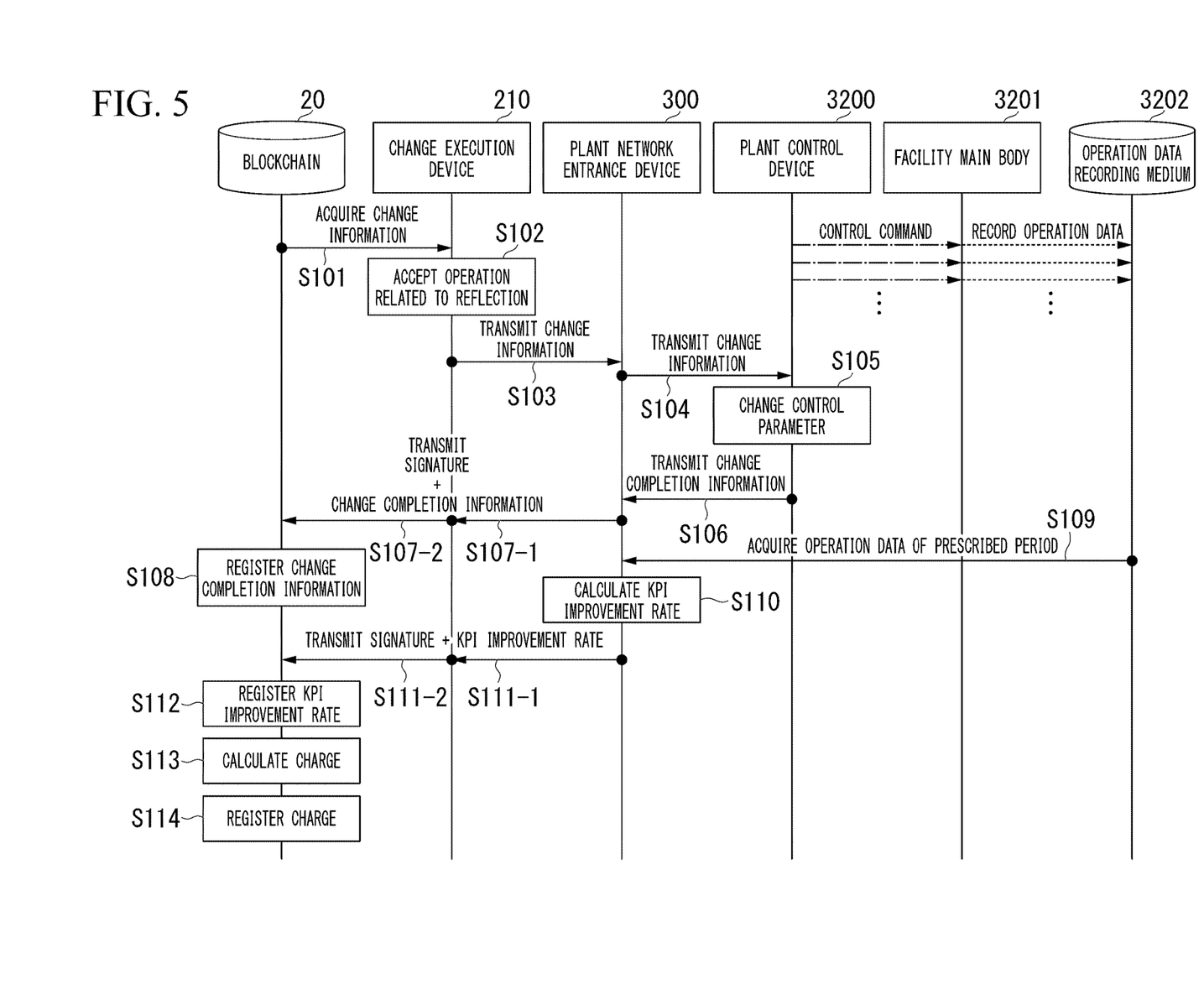
FIG. 5 is a diagram showing a processing sequence of the remote service system according to the first embodiment.

FIG. 5 is a diagram showing a processing sequence of the remote service system according to the first embodiment.

Also, FIGS. 6 to 9 are diagrams showing examples of various types of data to be used in a process of the remote service system according to the first embodiment.

Hereinafter, a flow of the entire process to be performed by the remote service system 1 will be described in detail with reference to a sequence diagram shown in FIG. 5 and the example of various types of data shown in FIGS. 6 to 9.

The processing sequence shown in FIG. 5 is started from a point in time when approved change information is registered in the blockchain 20 through procedures of the service provider S and the change detail confirmer C via the change request device 100 and the change confirmation device 200. At this point, the change executant I operates the change execution device 210 and checks whether or not the approved change information has been registered in the blockchain 20.

The change execution device 210 acquires the approved change information registered in the blockchain 20 in accordance with an operation input from the change executant I (step S101). The change executant I checks specific details of the change information acquired in step S101 through a display monitor or the like.

Figure 6:
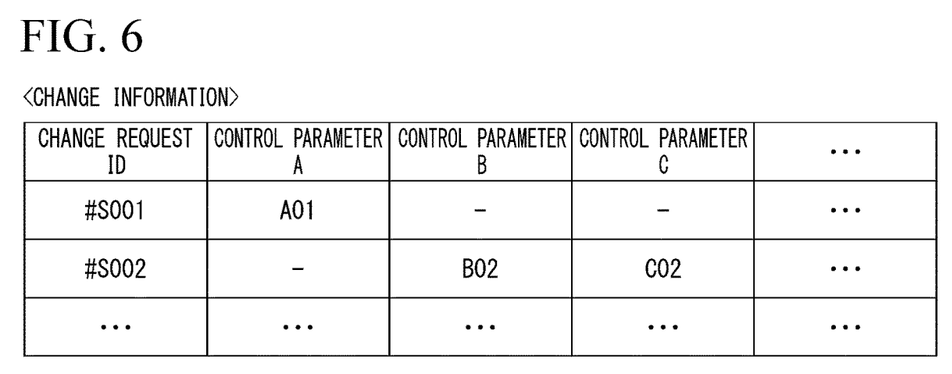
FIG. 6 is a diagram showing an example of various types of data to be used in a process of the remote service system according to the first embodiment.

FIG. 6 shows an example of a specific data structure of the approved change information.

In the blockchain 20, for example, the approved change information as shown in FIG. 6 is registered. As shown in FIG. 6, the approved change information is associated with a change request ID that is identification information for individually identifying change information related to a proposal of the service provider S and a change value for each of control parameters (control parameters A, B, C, and the like) related to the proposal of the service provider S.

For example, according to the example shown in FIG. 6, change information to which a change request ID of "#S001" is attached indicates that the control parameter A is required to be changed to a change value of "A01". Also, change information to which a change request ID of "#S002" is attached indicates that the control parameter B is required to be changed to a change value of "B02" and the control parameter C is required to be changed to a change value of "C02".

Also, when the change request device 100 (FIG. 1) accepts a request for registering change information from the service provider S, the change request device 100 (FIG. 1) associates a change request ID with each piece of the change information and registers the change request ID associated with each piece of the change information in the blockchain 20. At this time, the change request device 100 may attach a change request ID capable of being distinguished from the change information registered in the blockchain 20 through another terminal device (the change confirmation device 200, the change execution device 210, or the like). For example, the change request device 100 may attach a change request ID starting from a predetermined identifier "S" to change information to be registered in the blockchain 20 from the change request device 100.

Here, as will be described below, the blockchain 20 can register change information even from a terminal device other than the change request device 100 (the change confirmation device 200 or the change execution device 210). For example, the change detail confirmer C who is a plant manager can register (and approve) change information created by himself/herself in the blockchain 20 without depending on the proposal from the service provider S.

According to the above-described function of the change request device 100, because the change request ID starting from the identifier "S" is necessarily attached to the change information registered through the change request device 100, it is possible to identify which of a plurality of pieces of change information registered in the blockchain 20 is based on the proposal from the service provider S.

Returning to FIG. 5, subsequently, the change executant I performs an operation of causing a change value of the control parameter indicated by the change information acquired from the blockchain 20 in step S101 to be reflected in the actual plant facility 320. At this time, the change execution device 210 accepts the above-described operation of causing a change value of the control parameter to be reflected in the plant facility 320 from the change executant I (step S102). Then, when the operation is accepted, the change execution device 210 transmits the change information acquired in step S101 to the plant network entrance device 300 via the dedicated communication line (FIG. 1) (step S103). The change information reception unit 3011 of the plant network entrance device 300 receives the change information from the change execution device 210.

Subsequently, the change information transmission unit 3012 of the plant network entrance device 300 transfers the change information received in step S103 to the plant control device 3200 (step S104).

When the plant control device 3200 receives the change information from the plant network entrance device 300, the plant control device 3200 performs a process of changing each currently applied control parameter to a control parameter indicated by the received change information (step S105).

Also, as shown in FIG. 5, the plant control device 3200 outputs a control command to the facility main body 3201 from moment to moment on the basis of control parameters applied at a current point in time and manages an operation state of the facility main body 3201. Also, as shown in FIG. 5, operation data of the facility main body 3201 according to the control command of the plant control device 3200 (detection values acquired through various sensors installed in the facility main body 3201) is recorded and stored in the operation data recording medium 3202 from moment to moment.

When the control parameter is changed by the processing of step S105, the plant control device 3200 immediately outputs a control command to the facility main body 3201 on the basis of the control parameter after the change from that point in time. The operation data of the facility main body 3201 according to the control parameter after the change is recorded on the operation data recording medium 3202.

Subsequently, when the change in the control parameter related to the change information received in step S104 is completed, the plant control device 3200 transmits change completion information in association with identification information (a change request ID) of the change information (step S106). The change completion information reception unit 3013 of the plant network entrance device 300 receives the change completion information from the plant control device 3200.

When the change completion information is received from the plant control device 3200, the change completion information transmission unit 3014 of the plant network entrance device 300 attaches a signature to the change completion information and transmits the change completion information to which the signature is attached to the change execution device 210 (step S107-1). The reception unit 2111 of the change execution device 210 receives the change completion information to which the signature is attached from the plant network entrance device 300.

The transmission unit 2112 of the change execution device 210 puts the change completion information and the signature received in step S107-1 into a transaction and transmits the transaction to the blockchain 20 (step S107-2).

Here, the "signature" is information for proving that the information (the change completion information) to be transmitted has been transmitted from a formal transmitter (the plant network entrance device 300 in the present embodiment). The "signature" may be, for example, information in which a hash value of information to be transmitted is encrypted using a transmitter-specific secret key. The blockchain 20 at a reception side decrypts the "signature" with a public key (corresponding to the secret key) acquired in advance and therefore it is possible to identify whether or not the received change completion information has been transmitted by the formal transmitter (the plant network entrance device 300).

First, the registration unit 2001 of the blockchain 20 determines whether or not the change completion information included in the transaction has been transmitted from the plant network entrance device 300 on the basis of the signature included in the transaction received in step S107-2.

When it is determined that the change completion information included in the transaction has been transmitted from the plant network entrance device 300, the registration unit 2001 creates a new block incorporating the transaction (the change completion information) and registers the new block in connection with the existing block (step S108).

Figure 7:
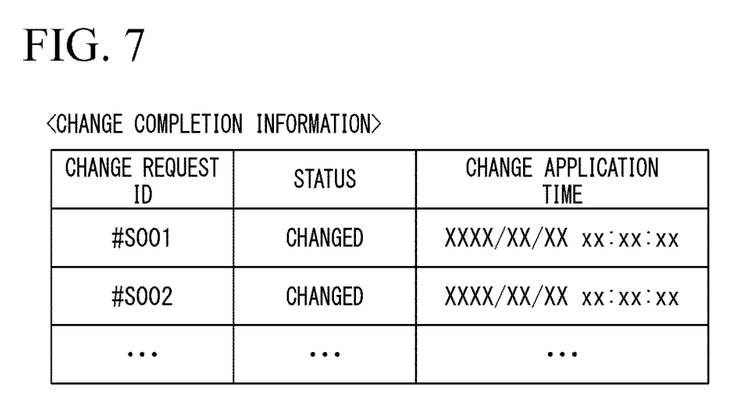
FIG. 7 is a diagram showing an example of various types of data to be used in a process of the remote service system according to the first embodiment.

FIG. 7 shows an example of a specific data structure of change completion information registered in the blockchain 20.

For example, the change completion information as shown in FIG. 7 is registered in the blockchain 20. As shown in FIG. 7, a change request ID indicating change information of change completion, a status indicating that a change in a control parameter related to the change information has already been completed (a "changed" status), and a change application time that is a time at which the change related to the change information was applied are associated in the change completion information. By registering the change completion information in which the change request ID is associated with the status and the change application time in the blockchain 20, the service provider S, the change detail confirmer C, and the change executant I can ascertain the fact that the control parameter change which is proposed, approved, and executed have actually been reflected in the plant facility 320 and the change application time through their respective terminal devices.

Referring back to FIG. 5, subsequently, the operation data acquisition unit 3015 of the plant network entrance device 300 acquires operation data stored during a prescribed period with reference to the operation data recording medium 3202 (step S109). Here, processing details of step S109 by the operation data acquisition unit 3015 will be described in detail with reference to FIG. 8.

Figure 8:
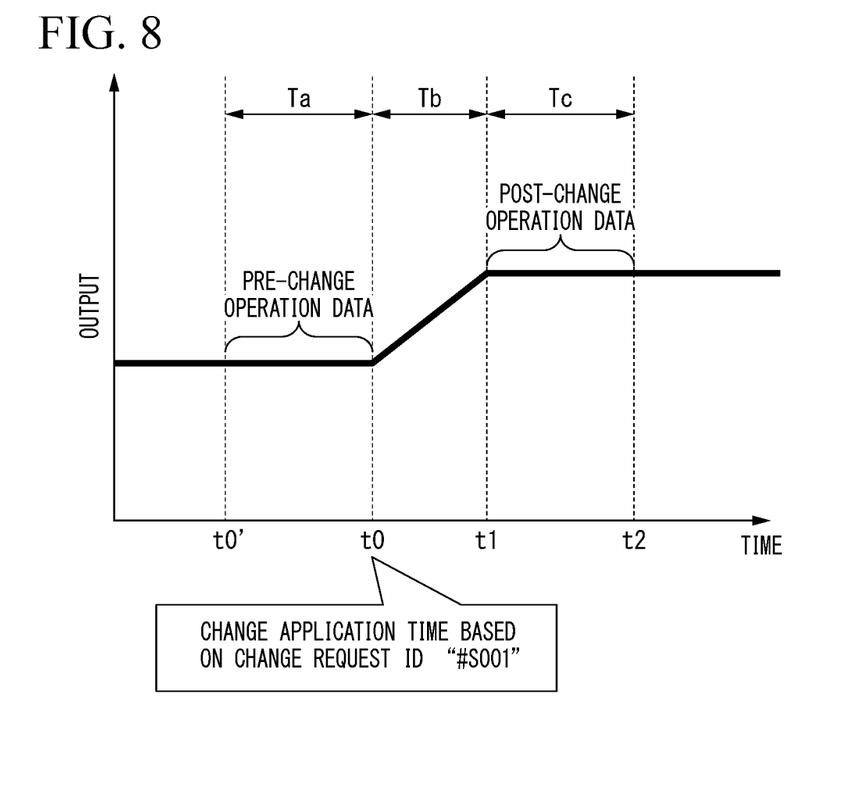
FIG. 8 is a diagram showing an example of various types of data to be used in a process of the remote service system according to the first embodiment.

FIG. 8 shows a time series of operation data relative to an "output" of the plant facility 320.

In FIG. 8, a time t0 is, for example, a time at which change information of "#S001" was reflected in the plant facility 320. Also, a period Ta from a time t0' (t0'<t0) to a time t0 is a prescribed period immediately before the change information of "#S001" is reflected. Operation data acquired during this period Ta is "pre-change operation data". Also, a period Tb from the time t0 to a time t1 (t1>t0) is a period in which the operation state (output) of the plant facility 320 is transiently changed due to the reflection of the change information of "#S001". Also, a period Tc from the time t1 to a time t2 (t2>t1) is a prescribed period immediately after the transient change of the operation state during the period Tb is settled and the operation state is a steady state. Operation data acquired during this period Tc is "post-change operation data".

In step S109, the operation data acquisition unit 3015 acquires the pre-change operation data and the post-change operation data shown in FIG. 8 with reference to the change application time (FIG. 7) included in the change completion information from the plant control device 3200. At this time, the operation data acquisition unit 3015 may determine whether or not the transient change immediately after the change information application during the period Tb has been settled (i.e., whether or not the operation state is the steady state) by determining whether or not an amount of change per unit time of the operation data has been equal to or less than a prescribed determination threshold value.

Referring back to FIG. 5, subsequently, the improvement rate calculation unit 3016 of the plant network entrance device 300 uses the pre-change operation data and the post-change operation data acquired in step S109 to calculate a key performance indicator (KPI) improvement rate (step S110). Here, the key performance indicator is a performance index of the plant facility 320 and may be, for example, an amount of cost saving (consumption/input), energy saving (consumption energy/input energy), environmental load reduction (a toxic substance emission quantity), or the like.

Specifically, the improvement rate calculation unit 3016 calculates a "pre-change KPI" that is a KPI calculated on the basis of the pre-change operation data and calculates a "post-change KPI" that is a KPI calculated on the basis of the post-change operation data. Then, the improvement rate calculation unit 3016 calculates a ratio of the post-change KPI to the pre-change KPI as a KPI improvement rate.

Next, the improvement rate transmission unit 3017 of the plant network entrance device 300 attaches a "signature" to the KPI improvement rate calculated in step S110, and transmits the KPI improvement rate to which the "signature" is attached to the change execution device 210 (step S111-1). The reception unit 2111 of the change execution device 210 receives the KPI improvement rate to which the signature is attached from the plant network entrance device 300.

The transmission unit 2112 of the change execution device 210 puts the KPI improvement rate and the signature received in step S111-1 into a transaction and transmits the transaction to the blockchain 20 (step S111-2).

First, the registration unit 2001 of the blockchain 20 determines whether or not the KPI improvement rate included in the transaction is a KPI improvement rate transmitted from the plant network entrance device 300 on the basis of the signature included in the transaction received in step S111-2.

When it is determined that the KPI improvement rate included in the transaction is a KPI improvement rate transmitted from the plant network entrance device 300, the registration unit 2001 creates a new block incorporating the transaction (the KPI improvement rate) and registers the new block in connection with the existing block (step S112).

When the KPI improvement rate is registered as the new block, the charge calculation unit 2002 of the blockchain 20 calculates a charge according to the KPI improvement rate registered in step S112 (step S113). For example, the charge calculation unit 2002 may calculate the charge by multiplying the KPI improvement rate registered in step S112 by a predefined proportional coefficient.

Subsequently, the registration unit 2001 further creates a new block into which the charge calculated in step S113 is incorporated and registers the new block (step S114).

Figure 9:
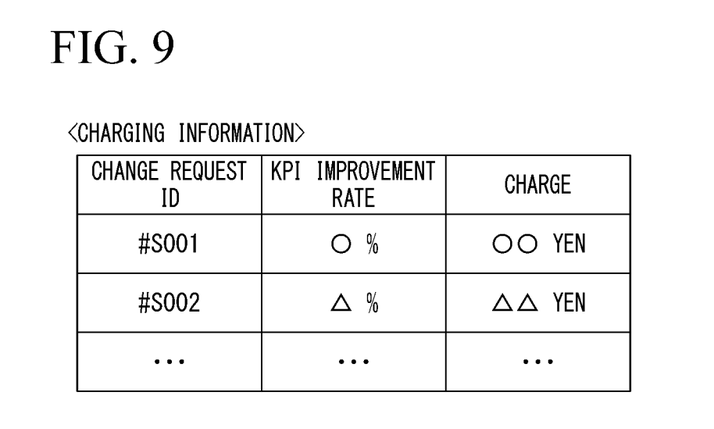
FIG. 9 is a diagram showing an example of various types of data to be used in a process of the remote service system according to the first embodiment.

FIG. 9 shows an example of a specific data structure of charging information registered in the blockchain 20.

For example, the charging information as shown in FIG. 9 is registered in the blockchain 20. As shown in FIG. 9, a change request ID, a KPI improvement rate, and a charge are associated in the charging information. Here, the KPI improvement rate is a value indicating a degree of improvement of the KPI obtained as a result of reflecting the change information identified in the change request ID. The charge is an amount of compensation to be paid from the change detail confirmer C to the service provider S to be determined in accordance with the KPI improvement rate.

For example, according to the example shown in FIG. 9, as a result of reflecting the change information of "#S001" in the plant facility 320, it is shown that a KPI improvement rate of "O %" was obtained. Therefore, the service provider S proposing the change information of "#S001" can receive payment for compensation of "OO yen" according to the KPI improvement rate of "O %" from the change detail confirmer C.

(Action and Effects)

As described above, according to the plant network entrance device 300 of the remote service system 1 according to the first embodiment, the operation data acquisition unit 3015 refers to a change application time at which a change was applied by the plant control device 3200 and automatically extracts pre-change operation data and post-change operation data from the operation data recording medium 3202 on the basis of the change application time. The improvement rate calculation unit 3016 calculates an improvement rate (a KPI improvement rate) for operation states of the plant facility 320 before and after a change in a control parameter on the basis of the pre-change operation data and the post-change operation data that have been extracted.

Thereby, when the control parameter has been changed on the basis of the proposal of the service provider S, the change detail confirmer C can easily ascertain the improvement effect of the operation state of the plant based on the change.

Also, the blockchain 20 according to the first embodiment includes the charge calculation unit 2002 configured to calculate a charge according to the KPI improvement rate transmitted from the plant network entrance device 300 and the registration unit 2001 configured to register a result of calculating the charge as a new block.

According to such a configuration, the charge according to the KPI improvement rate transmitted from the plant network entrance device 300 is calculated and registered as a new block on the basis of a program (a smart contract) that is difficult to alter and is pre-registered in the blockchain 20.

Also, according to the first embodiment described above, the blockchain 20 is configured to include at least nodes owned by each of the service provider S and the change detail confirmer C.

Thus, the possibility of illegal claim (such as alteration of a billed amount) by the service provider S can be reduced and the change detail confirmer C who is the customer can more easily understand the payment of the compensation.

Also, according to the plant network entrance device 300 of the remote service system 1 according to the first embodiment, the change completion information reception unit 3013 receives change completion information indicating that a change in a control parameter has been completed from the plant facility 320 (the plant control device 3200) and the change completion information transmission unit 3014 transmits the change completion information to the blockchain 20.

Thus, because information indicating that change details proposed by the service provider S are actually reflected in the plant facility 320 (the change completion information) is registered in the blockchain 20 that is difficult to alter, it is possible to further reduce the possibility of illegal claim by the service provider S.

Second Embodiment

Next, an information relay device and a remote service system including the same according to a second embodiment will be described with reference to FIGS. 10 and 11.
(Functional Configuration of Change Execution Device and Blockchain)

Figure 10:
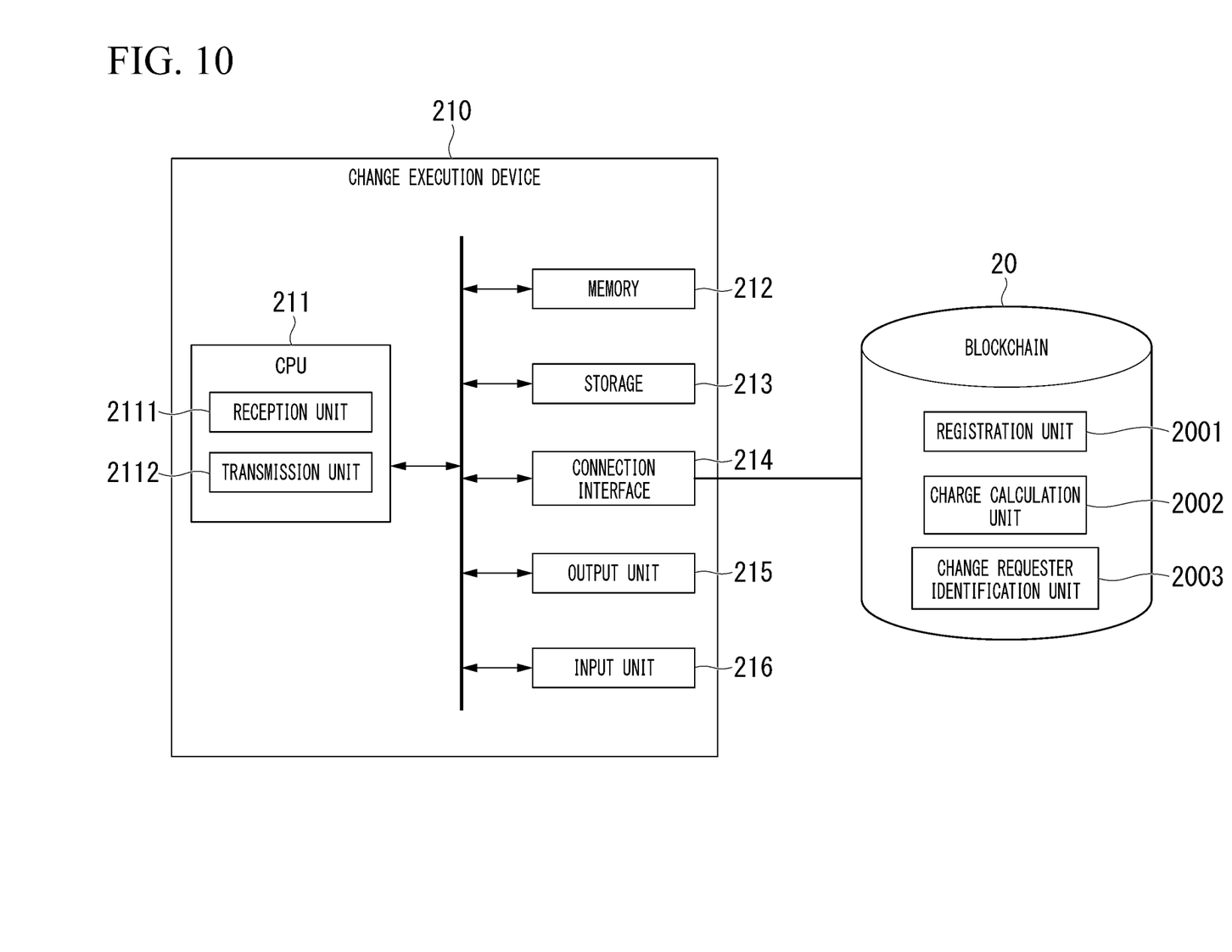
FIG. 10 is a diagram showing a functional configuration of a change execution device and a blockchain according to a second embodiment.

FIG. 10 is a diagram showing a functional configuration of a change execution device and a blockchain according to the second embodiment.

As shown in FIG. 10, a blockchain 20 according to the second embodiment further functions as a change requester identification unit 2003 according to a function of automatically executing a pre-registered program in addition to the functions described in the first embodiment.

The change requester identification unit 2003 identifies an attribute of a registrant (a service provider S, a change detail confirmer C, or a change executant I) of change information corresponding to a KPI improvement rate for the blockchain 20 on the basis of information (a change request ID) associated with the KPI improvement rate received from the plant network entrance device 300 in steps S111-1 and S111-2 of FIG. 5.

Also, although the blockchain 20 is schematically described as one data server device in FIG. 10, the blockchain 20 is actually a distributed ledger system including a plurality of nodes. Also, the process of the change requester identification unit 2003 described above is actually executed by the plurality of nodes constituting the blockchain 20 in cooperation with each other.
(Processing Flow of Change Execution Device)

Figure 11:
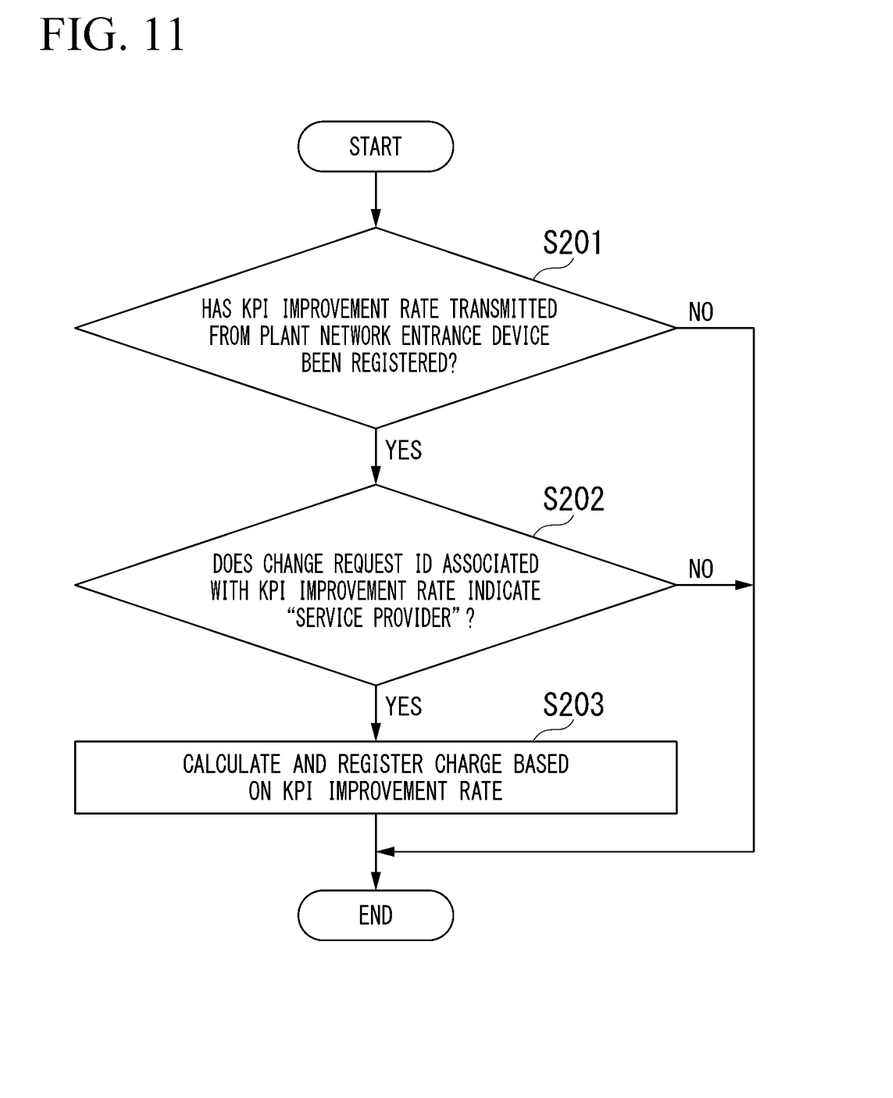
FIG. 11 is a diagram showing a processing flow of the change execution device according to the second embodiment.

FIG. 11 is a diagram showing a processing flow of the change execution device according to the second embodiment.

The blockchain 20 executes a process shown in FIG. 11 on the basis of a pre-registered program.

That is, the change requester identification unit 2003 of the blockchain 20 determines whether or not a KPI improvement rate transmitted from the plant network entrance device 300 has been registered as a new block (i.e., whether or not step S112 of FIG. 5 has been executed) (step S201). While the KPI improvement rate has not been registered as the new block (step S201: NO), the blockchain 20 does not execute any particular processing.

On the other hand, when the KPI improvement rate transmitted from the plant network entrance device 300 has been registered as the new block (step S201: YES), the change requester identification unit 2003 determines whether or not a registrant (a change requester) of the change information corresponding to the registered KPI improvement rate is the "service provider S" with reference to the change request ID associated with the registered KPI improvement rate (FIG. 9) (step S202). Specifically, the change requester identification unit 2003 determines whether or not the change request ID associated with the KPI improvement rate starts with a prescribed identifier "S".

When the registrant (the change requester) of the change information corresponding to the registered KPI improvement rate is the "service provider S" (step S202: YES), the improvement effect shown in the KPI improvement rate transmitted from the plant network entrance device 300 is brought about by the proposal of the service provider S. Therefore, in this case, it may be reasonable for the service provider S to request the change detail confirmer C to pay compensation corresponding to the KPI improvement rate. Therefore, the charge calculation unit 2002 and the registration unit 2001 of the blockchain 20 perform calculation and registration of a charge based on the registered KPI improvement rate in order to request the service provider S to pay the compensation (step S203).

On the other hand, when the registrant of the change information corresponding to the received KPI improvement rate is not the "service provider S" (step S202: NO), the improvement effect shown in the KPI improvement rate transmitted from the plant network entrance device 300 is considered to have been brought about by a proposal, an instruction, or the like of a person (for example, the change detail confirmer C, the change executant I, or the like) other than the service provider S. Therefore, in this case, it is not reasonable for the service provider S to receive payment of compensation according to the KPI improvement rate from the change detail confirmer C. Therefore, the charge calculation unit 2002 and the registration unit 2001 of the blockchain 20 terminate the processing without performing the charge calculation and registration process (step S203).
(Action and Effects)

As described above, the change requester identification unit 2003 of the blockchain 20 according to the second embodiment identifies a registrant of change information on the basis of information associated with a KPI improvement rate transmitted from the plant network entrance device 300 (a change request ID in the present embodiment).

Thus, it is possible to determine whether or not the KPI improvement rate registered as a new block has been brought about on the basis of a service of the service provider S and request payment of compensation on the basis of only the improvement effect brought about on the basis of the service of the service provider S. Thereby, it is possible to improve the reasonability of the payment for the service.
(Modified Examples of Respective Embodiments)

Although the plant network entrance device 300 and the remote service system 1 including the same according to the first and second embodiments have been described above in detail, specific aspects of the plant network entrance device 300 and the remote service system 1 are not limited to those described above and various design changes and the like can be made without departing from the spirit and the scope of the present invention.

For example, although an aspect in which a change request ID starting from a predetermined identifier "S" is attached to the change information registered by the service provider S has been described in the first and second embodiments, other embodiments are not limited to such an aspect.

For example, registrant information for identifying which of the service provider S, the change detail confirmer C, and the change executant I has performed a change information registration procedure may be simply associated with the change information.

Also, an aspect in which the blockchain 20 of the remote service system 1 according to the first embodiment has been described as a blockchain configured between the service provider S and the change detail confirmer C who is one customer and the change executant I. However, other embodiments are not limited to this aspect. In the blockchain 20 of the remote service system 1 according to another embodiment, for example, the blockchain 20 used for each of a plurality of customers (change detail confirmers C1, C2, and the like) may be configured in the same network. In this case, it is preferable to prevent customers from mutually viewing information each other within the blockchain 20 configured in the same network. Thus, a management cost of the network can be reduced.

Also, although an aspect in which the plant network entrance device 300 calculates a KPI improvement rate and transmits a result of calculating the KPI improvement rate to the blockchain 20 in the remote service systems 1 according to the first and second embodiments has been described, other embodiments are not limited to this aspect.

For example, the plant network entrance device 300 of the remote service system 1 according to another embodiment may extract pre-change operation data and post-change operation data from the operation data recording medium 3202 of the plant facility 320 and transmit the pre-change operation data and the post-change operation data themselves to the blockchain 20. In this case, the blockchain 20 receives the pre-change operation data and the post-change operation data from the plant network entrance device 300 and calculates a KPI improvement rate and a charge on the basis of the received pre-change operation data and post-change operation data using a smart contract.

In each of the above-described embodiments, processes of various types of processing of the plant network entrance device 300, the change execution device 210, and the like are stored in a computer readable recording medium in the form of the program and various types of processing described above are performed by a computer reading and executing this program. Also, the computer readable recording medium refers to a magnetic disk, a magneto-optical disc, a CD-ROM, a DVD-ROM, a semiconductor memory, or the like. Also, a computer program may be delivered to a computer through a communication line and the computer receiving the delivered computer program may execute the program.

The above-described program may be a program for implementing some of the above-described functions. Further, the above-described program may be a program capable of implementing the above-described functions in combination with a program already recorded on the computer system, i.e., a so-called differential file (differential program).

Also, according to a second aspect of the present disclosure, the above-described information relay device may further include a change completion information reception unit configured to receive change completion information indicating that the change in the control parameter has been completed from the plant facility; and a change completion information transmission unit configured to transmit the change completion information to the external device.

Also, according to a third aspect of the present disclosure, the improvement rate transmission unit may be configured to transmit the improvement rate to which a signature of the information relay device is attached.

Also, according to a fourth aspect of the present disclosure, a remote service system may include the above-described information relay device; a distributed ledger system; and a terminal device serving as the external device and configured to transmit a request for registering new information to the distributed ledger system.

Also, according to a fifth aspect of the present disclosure, the distributed ledger system may include a charge calculation unit configured to calculate a charge determined in accordance with the improvement rate when a request for registering the improvement rate has been received from the terminal device; and a registration unit configured to register a result of calculating the charge.

Also, according to a sixth aspect of the present disclosure, the distributed ledger system may further include a change requester identification unit configured to identify a registrant of the change information on the basis of information associated with the improvement rate when the request for registering the improvement rate has been received from the terminal device, and the registration unit may be configured to register the result of calculating the charge only when an attribute of the registrant is a prescribed attribute.

Also, according to a seventh aspect of the present disclosure, there is provided an information relay method of relaying information between a plant facility and an external device, the information relay method including the steps of: receiving change information for changing a control parameter of the plant facility from the external device; transmitting the change information to the plant facility; acquiring pre-change operation data that is operation data before a time at which a change in the control parameter based on the change information is made and post-change operation data that is operation data after the time at which the change is made; calculating an improvement rate for operation states before and after the change on the basis of the pre-change operation data and the post-change operation data; and transmitting the improvement rate to the external device.

According to an eighth aspect of the present disclosure, there is provided a non-transitory computer readable medium recording a program for causing a computer of an information relay device for relaying information between a plant facility and an external device to execute the steps of: receiving change information for changing a control parameter of the plant facility from the external device; transmitting the change information to the plant facility; acquiring pre-change operation data that is operation data before a time at which a change in the control parameter based on the change information is made and post-change operation data that is operation data after the time at which the change is made; calculating an improvement rate for operation states before and after the change on the basis of the pre-change operation data and the post-change operation data; and transmitting the improvement rate to the external device.

While several embodiments of the present invention have been described, these embodiments have been presented by way of example only, and are not intended to limit the scope of the inventions. These embodiments may be embodied in a variety of other forms. Various omissions, substitutions and changes may be made without departing from the spirit of the inventions. The inventions described in the accompanying claims and their equivalents are intended to cover such embodiments or modifications as would fall within the scope and spirit of the inventions.

REFERENCE SIGNS LIST

1 Remote service system
20 Blockchain
2001 Registration unit
2002 Charge calculation unit
2003 Change requester identification unit
100 Change request device (terminal device)
200 Change confirmation device (terminal device)
210 Change execution device (terminal device)
211 CPU
2111 Reception unit
2112 Transmission unit
212 Memory
213 Storage
214 Connection interface
215 Output unit
216 Input unit
300 Plant network entrance device (information relay device)
301 CPU
3011 Change information reception unit
3012 Change information transmission unit
3013 Change completion information reception unit
3014 Change completion information transmission unit
3015 Operation data acquisition unit
3016 Improvement rate calculation unit
3017 Improvement rate transmission unit
302 Memory
303 Storage
304 Connection interface
310 Firewall
320 Plant facility
3200 Plant control device
3201 Facility main body
3202 Operation data recording medium
330 Data diode

The invention claimed is:

1. An information relay device configured to relay information between a plant facility and an external device, the information relay device comprising:
a memory configured to store a program; and
a processor configured to execute the program and control the information relay device to:
receive change information for changing a control parameter of the plant facility from the external device;
transmit the change information to the plant facility;
acquire pre-change operation data that is operation data before a time at which a change in the control parameter based on the change information is made and post-change operation data that is operation data after the time at which the change is made;
calculate an improvement rate for operation states before and after the change on the basis of the pre-change operation data and the post-change operation data; and
transmit the improvement rate to the external device.

2. The information relay device according to claim 1, wherein the processor is further configured to execute the program and control the information relay device to:
receive change completion information indicating that the change in the control parameter has been completed from the plant facility; and
transmit the change completion information to the external device.

3. The information relay device according to claim 1, wherein the processor is further configured to execute the program and control the information relay device to transmit the improvement rate to which a signature of the information relay device is attached.

4. A remote service system comprising:
the information relay device according to claim 1;
a distributed ledger system; and
a terminal device serving as the external device and configured to transmit a request for registering new information to the distributed ledger system.

5. The remote service system according to claim 4, wherein the distributed ledger system includes
a memory configured to store a program; and
a processor configured to execute the program and control the distributed ledger system to:
calculate a charge determined in accordance with the improvement rate when a request for registering the improvement rate has been received from the terminal device; and
register a result of calculating the charge.

6. The remote service system according to claim 5, wherein the processor is further configured to execute the program and control the distributed ledger system to identify a registrant of the change information on the basis of information associated with the improvement rate when the request for registering the improvement rate has been received from the terminal device, and register the result of calculating the charge only when an attribute of the registrant is a prescribed attribute.

7. An information relay method of relaying information between a plant facility and an external device, the information relay method comprising the steps of:
receiving change information for changing a control parameter of the plant facility from the external device;
transmitting the change information to the plant facility;
acquiring pre-change operation data that is operation data before a time at which a change in the control parameter based on the change information is made and post-change operation data that is operation data after the time at which the change is made;
calculating an improvement rate for operation states before and after the change on the basis of the pre-change operation data and the post-change operation data; and
transmitting the improvement rate to the external device.

8. A non-transitory computer readable medium recording a program for causing a computer of an information relay device for relaying information between a plant facility and an external device to execute the steps of:
receiving change information for changing a control parameter of the plant facility from the external device;
transmitting the change information to the plant facility;
acquiring pre-change operation data that is operation data before a time at which a change in the control parameter based on the change information is made and post-change operation data that is operation data after the time at which the change is made;
calculating an improvement rate for operation states before and after the change on the basis of the pre-change operation data and the post-change operation data; and
transmitting the improvement rate to the external device.

* * * * *